Oct. 11, 1938.     R. O. ALLEN     2,132,506
HOSE COUPLING
Filed Feb. 3, 1937     2 Sheets-Sheet 1

INVENTOR
*Roy O. Allen.*
BY
HIS ATTORNEY.

Oct. 11, 1938.   R. O. ALLEN   2,132,506
HOSE COUPLING
Filed Feb. 3, 1937    2 Sheets-Sheet 2

INVENTOR
Roy O. Allen.
BY
HIS ATTORNEY.

Patented Oct. 11, 1938

2,132,506

UNITED STATES PATENT OFFICE 2,132,506

HOSE COUPLING

Roy O. Allen, Athens, Pa., assignor to Ingersoll-Rand Company, Jersey City, N. J., a corporation of New Jersey Application February 3, 1937, Serial No. 123,801

1 Claim. (Cl. 285—67)

This invention relates to couplings, and more particularly to a hose coupling adapted to connect hose or conduit sections together in sealing relationship.

One object of the invention is to enable the hose sections to be quickly connected together and detached from each other.

Another object is to prevent accidental disconnection of the members comprising the hose connection.

Other objects will be in part obvious and in part pointed out hereinafter.

Figure 1:
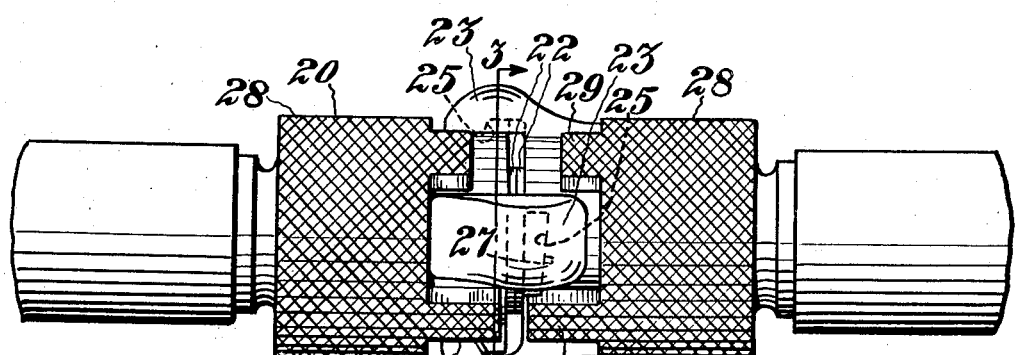
Figure 2:
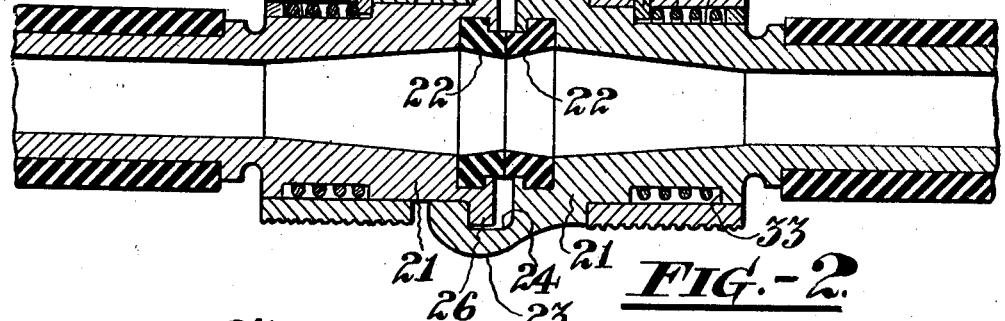
Figure 3:
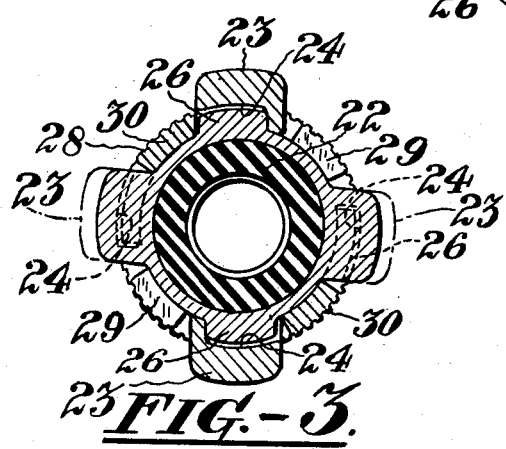
Figure 4:
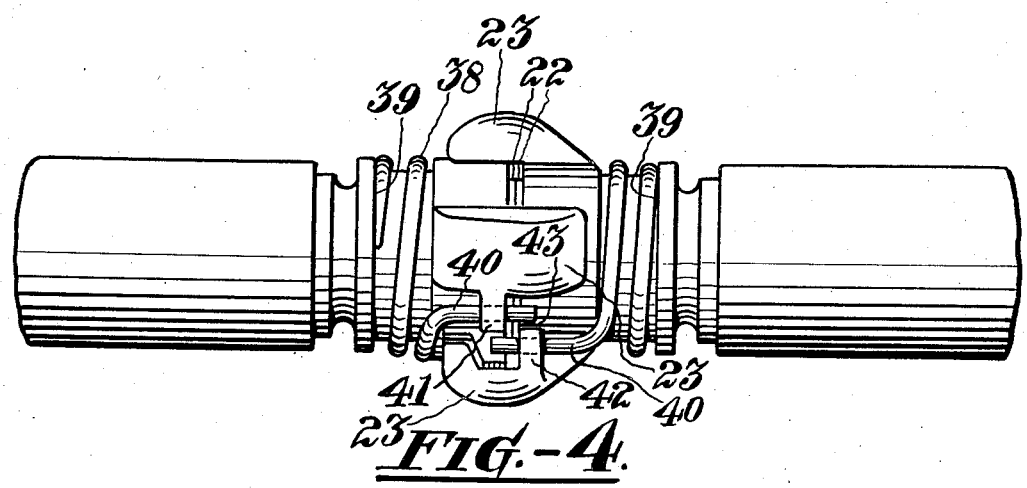
Figure 5:
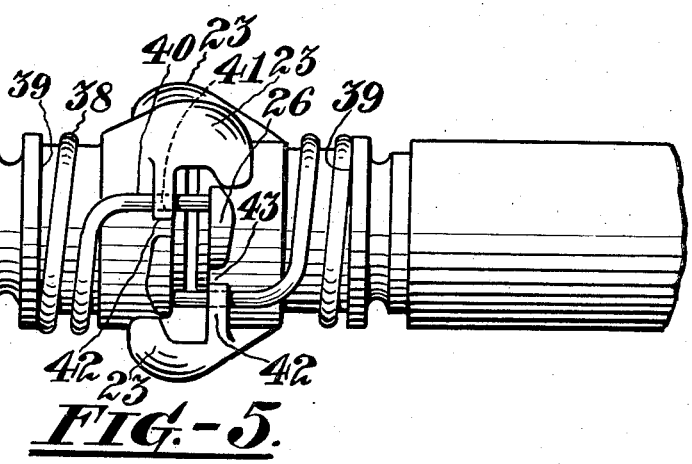

In the drawings accompanying this specification and in which similar reference numerals refer to similar parts, Figure 1 is a longitudinal side view of a hose coupling constructed in accordance with the practice of the invention, Figure 2 is a longitudinal view, in section, of the hose coupling, Figure 3 is a transverse view taken through Figure 1 on the line 3—3, Figure 4 is a view similar to Figure 1 showing a further modification of the invention, and Figure 5 is a longitudinal side view of the coupling illustrated in Figure 4 and showing the parts in position to be connected together.

Referring more particularly to the drawings and at first to the form of the invention illustrated in Figures 1 to 3 inclusive, 20 designates, in general, a hose coupling comprising a pair of sleeves 21.

Structurally, the sleeves are identical. They are arranged in end to end relationship and are provided with packing members 22 which extend beyond the ends of the sleeves and are pressed firmly into sealing relationship with each other when the sleeves 21 are connected together.

On the peripheries of the sleeves are lugs 23 which are equally spaced with respect to each other and extend beyond the ends of the sleeves to overlap a portion of the adjacent sleeve. In the inner surface of the lugs 23 and preferably immediately adjacent the ends of the sleeves are arcuate grooves 24 of which the sides remote from the end of the sleeve constitute cam surfaces 25.

The grooves 24 are intended to accommodate arcuate ribs 26 of the adjacent sleeve and preferably arranged at right angles to the lugs. The ribs 26 are provided on their rear surfaces with cam surfaces 27 for cooperation with the cam surfaces 25 to press the packing members firmly together upon the impartation of rotary movement to the sleeves 21.

To the end that the sleeves 21 may be effectively restrained against unauthorized rotary movement with respect to each other each sleeve is provided with a locking member 28 in the form of cylindrical casings encircling and slidable on the sleeves 21. The external surfaces of the casings 28 are roughened, as by knurling, to provide gripping surfaces for actuating the casings. On the contiguous ends of the casings 28 are fingers 29 and 30 of which the latter are of somewhat greater length than the fingers 29. The fingers are of slightly less width than the spaces between the lugs 23 when the sleeves are connected together.

In order to assure the retention of the locking members in the locking position at all times the sleeves 21 are provided with peripheral grooves 31 to accommodate springs 32 which act with one end against the end surface 33 of the groove 31 and with their other ends against a projection, or projections, 34 carried by the sleeves and extending into the grooves 31.

In assembling the device the sleeves are so positioned with respect to each other that the lugs 23 of one sleeve lie in the longitudinal planes of the fingers 29 and 30 of the locking member on the other sleeve. The sleeves are then pressed together and the locking members are thereby retracted against the force of the springs 32. When the sleeves are pressed to a position in which the grooves 24 and the ribs 26 lie in the same transverse plane relative rotary movement is imparted to the sleeves, and during this movement the cam surfaces 25 and 27 will cause the sleeves to be drawn together and the packing members 22 to be pressed into effective sealing engagement with each other.

By rotating the sleeves into interlocking engagement with each other the lugs 23 will be moved out of the planes of the fingers 29 and 30 and the springs 32 will then actuate the locking members to their locking positions in which the fingers lie between the lugs 23.

Whenever it is intended to disconnect the sleeves from each other the locking members 28 are moved outwardly so that the short fingers 29 will lie outside of the transverse planes of the free ends of the lugs 23. The sleeves may then be rotated by means of the locking members until the ribs 26 are out of engagement with the grooves 24 after which the sleeves may be conveniently separated.

The modified form of the invention illustrated in Figures 4 and 5 differs only from that first described with respect to the locking means for holding the sleeves against rotary movement with respect to each other. In the present instance, a compression spring 38 is disposed about each sleeve and the outer ends of the spring is seated against a shoulder 39 which may be an integral portion of the sleeve. The opposite end of the spring 38 is in the form of a straight pin or plunger 40 which extends longitudinally of the coupling.

The pin 40 extends through an aperture 41 in a guide member 42 carried by the sleeve supporting the spring. The plunger 40 is of sufficient length to partly overlap the adjacent sleeve and, in the assembled positions of the sleeves, lies in a groove or space 43 defined by the adjacent ends of the arcuate ribs 26 and the guide member 42.

In assembling the coupling constructed in accordance with this form of the invention the sleeves are brought together in face to face relationship in such manner that the ends of the plungers 40 abut the rib 26 on the adjacent sleeve. The sleeves may then be pressed together to bring the ribs 26 into registry with the grooves 24. Such movement will press the plungers 40 outwardly and thereby place the springs 38 under compression. If then the sleeves are rotated relatively to each other to move the ribs 26 into the grooves 24 the said ribs will pass over the ends of the plungers 41 and when the ends of the ribs move out of the planes of the plungers the spring portion 38 will actuate the plungers 41 into the spaces 43 to hold the sleeve securely against unauthorized rotary movement.

I claim:

A hose coupling comprising a pair of sleeves arranged end to end, interlocking portions on the sleeves to prevent relative endwise movement of the sleeves, guide members on the sleeves having apertures therein, there being recesses in the peripheries of the sleeves to register with the apertures in the adjacent sleeve, plungers in the apertures to extend into the recesses for locking the sleeves against rotary movement with respect to each other, and springs integral with the plungers encircling the sleeves to maintain the plungers in the recesses.

ROY O. ALLEN.